March 10, 1970  J. E. RAMSEY, JR  3,500,199
INDUCTION METER HAVING SATURABLE PATH FOR
WORKING VOLTAGE MAGNETIC FLUX
Filed June 26, 1967

WITNESSES:
Leon M. Garman
James F. Young

INVENTOR
James E. Ramsey, Jr.
BY
ATTORNEY

United States Patent Office 3,500,199
Patented Mar. 10, 1970

3,500,199
INDUCTION METER HAVING SATURABLE PATH FOR WORKING VOLTAGE MAGNETIC FLUX
James E. Ramsey, Jr., Raleigh, N.C., assignor to Westinghouse Electric Corporation, Pittsburgh, Pa., a corporation of Pennsylvania
Filed June 26, 1967, Ser. No. 648,905
Int. Cl. G01r 11/02
U.S. Cl. 324—138                9 Claims

ABSTRACT OF THE DISCLOSURE

The voltage winding of an induction meter directs a voltage magnetic flux through the armature of the meter and through a magnetic path having a reluctance which depends on the magnitude of the voltage applied to the voltage winding. Part of this path is incorporated in phasing means for controlling the phase relationship between the voltage magnetic flux and the voltage applied to the voltage winding.

---

This invention relates to induction measuring devices and it has particular relation to induction measuring devices which are responsive to a function of the product of two variable quantities.

Aspects of the invention are applicable to induction devices, particularly those which are responsive to a function of volt-amperes. Such induction devices may be employed for indicating or integrating functions of volt-amperes such as vars or watts which are dependent on the product of voltage and current present in an alternating electrical circuit. The invention is particularly suitable for induction type watthour meters and will be described with reference to such meters.

In a conventional induction type watthour meter a voltage magnetic flux derived from a voltage winding and a current magnetic flux derived from current windings produce a shifting magnetic field in an air gap for driving an electro-conductive armature. The response of the armature is dependent on the magnitudes and phase relationship of these magentic fluxes.

In accordance with the invention a voltage magnetic flux is divided into a working magnetic flux which enters the air gap to traverse the armature and a leakage magnetic flux which by-passes the armature air gap. In order to maintain the accuracy of the meter over a large range of voltage energization the reluctance of the path for the working voltage magnetic flux is designed to vary independent of the voltage energization. In a preferred embodiment of the invention components employed for this purpose are incorporated in a structure which responds to the leakage voltage magnetic flux to establish a desired phase relationship between the applied voltage and the working voltage magnetic flux.

It is therefore an object of the invention to provide an induction device which is accurate over a substantial range of variation of applied voltage.

It is also an object of the invention to provide an induction type watthour meter which is accurate over a substantial range of variation of applied voltage and which has an adjustment dependent on the leakage voltage magnetic flux for establishing a desired phase relationship between the applied voltage and the leakage voltage magnetic flux.

Other objects of the invention will be apparent from the following description taken in conjunction with the accompanying drawing in which FIG. 1 is a schematic view with parts shown in elevation of a watthour meter system embodying the invention;

Figure 1:
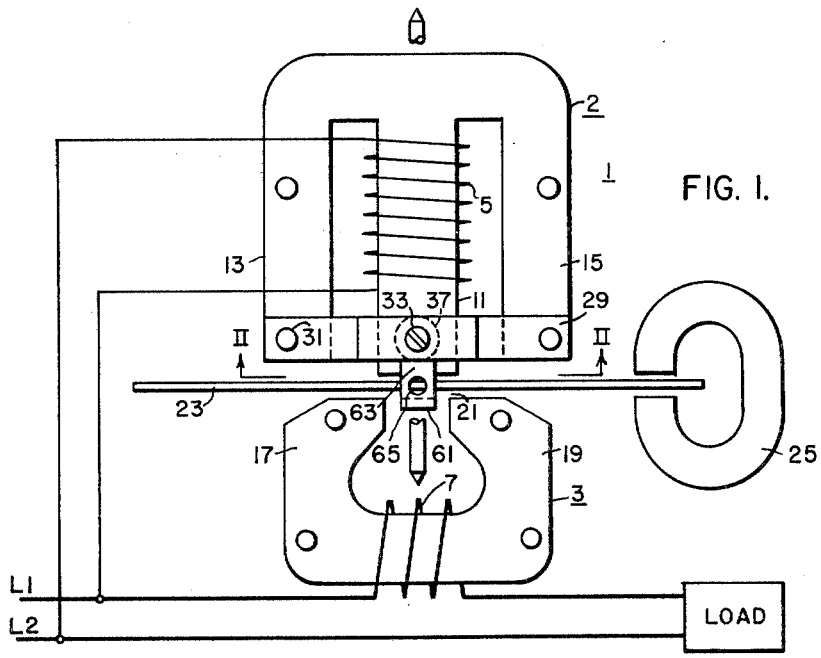

Referring to the drawing, FIG. 1 shows a watthour meter 1 for measuring energy supplied over an alternating current circuit represented by the conductors L1 and L2. Although this circuit may be a three-wire single-phase circuit or a polyphase circuit it will be assumed that it is a two-wire alternating-current circuit operating at a frequency of 60 cycles per second for transmitting electric energy from a line to a load. The watthour meter 1 includes a stator or electromagnet assembly which comprises a voltage magnetic section 2, a current magnetic section 3, and a voltage winding or coil 5. The magnetic sections are constructed of laminations of soft magnetic material such as silicon iron. The voltage section 2 is E-shaped and has a voltage pole 11 and two outer legs 13 and 15. The voltage coil 5 surrounds the voltage pole 11.

The current magnetic section has two current poles 17 and 19 which are spaced from the voltage pole 11 to define an air gap 21. The current poles 17 and 19 are formed by U-shaped laminations. A current winding 7 surrounds the base portion of the U-shaped laminations. The voltage coil 5 has a large number of turns of copper conductor of small diameter whereas the current winding 7 may be constructed of a relatively small number of turns of large-diameter copper conductor. It will be noted that the voltage pole 11, legs 13 and 15 and the current poles 17 and 19 all lie substantially in a common plane.

An electroconductive armature in the form of a disc 23 has a portion positioned in the air gap 21 and is mounted for rotation about the axis of the disc. A portion of the disc also is located in the air gap of a permanent magnet 25 for damping purposes. The construction of the watthour meter as thus far specifically set forth is well known in the art.

When the voltage coil 5 and the current winding 7 are properly energized from the conductors L1 and L2, a shifting magnetic field is produced in the air gap 21 which develops a torque acting between the disc 23 and the electromagnet for the purpose of producing rotation of the disc 23 about its axis. The rotation of the disc 23 is dependent on the product of the voltage between the conductors L1 and L2, the current flowing through the conductors and the phase displacement between such current and voltage. Rotation of the disc 23 may be employed in any suitable manner for indicating energy supplied over the conductors L1 and L2 as by operating a conventional register (not shown).

In order to adjust the phase relationship between the working voltage magnetic flux and the voltage supplied to the voltage winding a leakage path is established for voltage flux produced by the winding 5. This leakage path is linked by an electroconductive material in the manner set forth in my Patent 3,212,005 issued Oct. 12, 1965.

Figure 2:
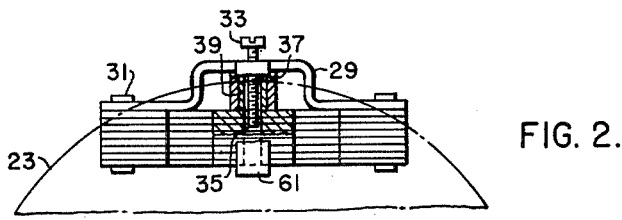
FIG. 2 is a sectional view taken along the line II—II of FIG. 1.
Figure 3:
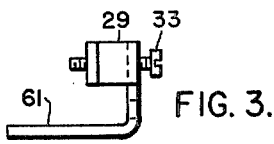
FIG. 3 is a view in end elevation of a bracket employed in the embodiment of FIGS. 1 and 2.

As shown in FIGS. 1 and 2 the leakage path takes the form of a bracket 29 constructed of a soft magnetic material such as cold rolled steel. This bracket has its ends secured repsectively to the outer legs 13 and 15 in any suitable manner as by rivets 31. It will be noted that this bracket extends across the free end of the voltage pole 11 and is spaced from such pole.

At a central point the bracket has a threaded opening for receiving a machine screw 33 constructed of a soft magnetic material such as soft magnetic steel. The tip of this screw may extend into an opening 35 provided in the voltage pole 11.

The bracket 29 and the screw 33 establishes a path for leakage magnetic flux derived from the voltage coil 5 which extends from the voltage pole 11 to the screw 33. From the screw 33 the path continues through two parallel branches formed by two halves of the bracket 29 to the outer legs 13 and 15. The amount of leakage magnetic flux passing through this magnetic path may be adjusted by rotating the screw 33 to alter its axial position relative to the voltage pole 11.

The magnetic path formed by the screw 33 and the bracket 29 is employed for adjustably loading the voltage coil 5. To this end an electroconductive member is positioned to be linked by magnetic flux passing through the magnetic path. In the embodiment of FIG. 2 the electroconductive member takes the form of a tube 37 which may be constructed of copper and which is concentric with the screw 33.

In effect the tube 37 constitutes a closed secondary winding for a transformer in which the primary winding is represented by the voltage coil 5. Losses due to current flowing in the tube 37 are reflected back to the voltage coil 5. The loading is adjusted by manipulation of the screw 33 and is employed for adjusting the angle by which magnetic flux derived from the voltage coil 5 lags the voltage applied to the coil. By this expedient the working voltage magnetic flux applied by the voltage coil 5 to the air gap 21 and the armature 23 may be brought into quadrature with the current magnetic flux applied by the current winding 7 to the air gap when the watthour meter is operating to measure a unity power factor load.

Class II temperature compensation for the watthour meter may be provided as set forth in my aforesaid patent. As shown in FIG. 2 a sleeve 39 of an austenitic iron nickel alloy having approximately 30% nickel is concentric with, and intermediate, the screw 33 and the tube 37. Such a sleeve has a substantial negative temperature coefficient of permeability over the range of temperatures to which watthour meters are normally subjected in operation.

In order to improve the efficiency of the watthour meter a soft magnetic tongue 61 is located intermediate the pole faces of the current poles 17, 19 and in substantially the same plane as such pole faces. This tongue is connected through a soft magnetic element 63 to the mid part of the bracket 29. In a preferred embodiment of the invention the tongue 61, the element 63 and the bracket 29 are integrally constructed from a sheet of soft magnetic material.

The tongue 61 is spaced from the pole face of the voltage pole 11 to define an air gap in which the armature 23 is located. Working voltage magnetic flux enters this air gap from the voltage pole and then passes through the tone 61, the element 63, the bracket 29, and the two legs 13 and 15 in parallel back to the voltage pole 11.

The structure thus far specifically described provides good performance. However, the accuracy has been found to fall off when the voltage coil 5 is energized by a reduced voltage. For example, the voltage coil 5 may be designed for energization by a voltage within the range of 240 volts or less. Assuming that the accuracy is 100% when the voltage coil is energized by the full voltage or 240 volts, it has been found that when the voltage coil is energized by half voltage or 120 volts the meter runs slightly slow and the accuracy drops to 99% or 98% at 50% power factor. Although such accuracy is adequate for a number of applications of the watthours meter an improvement in such accuracy is desirable.

In accordance with the invention the path followed by the working voltage magnetic flux is designed to saturate within the range of rated voltage for which the watthour meter is designed. Conveniently the element 63 may be given a cross section such that it is saturated when the voltage coil is energized by 240 volts. However when the voltage coil is energized by 120 volts the cross section is not saturated. This construction may be proportioned to provide a substantially uniform accuracy of the watthour meter over the voltage range from 240 volts to less than 120 volts.

In a preferred embodiment of the invention the desired cross section of the element 63 is provided by a hole 65 which extends through the element to decrease its cross section. Such a hole provides the desired reduction in cross section while assuring adequate rigidity of the parts.

I claim as my invention:

1. An induction device responsive to a function of the volt-amperes in an alternating current circuit and including an electromagnetic unit comprising an E-shaped planar soft magnetic section having a central voltage pole and two outer legs projecting from a yoke, the voltage pole having a free pole face, a soft magnetic current section having two current poles with free pole faces spaced from the voltage pole face to define an air gap therebetween, voltage winding means effective when energized in accordance with an alternating voltage within a rated range for directing alternating first magnetic flux through the voltage pole into the air gap, current winding means effective when energized by alternating current for directing alternating second magnetic flux through the current poles into the air gap to establish with the first magnetic flux a shifting resultant magnetic field in the air gap, an electroconductive armature device mounted for rotation relative to the electromagnetic unit about an axis, said armature device having a portion positioned in said air gap to develop a torque from said resultant magnetic field which acts to rotate the armature device relative to the electromagnet unit about the axis and which decreases with a predetermined decrease in voltage applied to the voltage winding means at an undesired rate, wherein the improvement comprises compensating means for compensating for the undesired rate, said compensating means comprising a soft magnetic path for said first magnetic flux which is proportioned to have a degree of saturation which varies in dependence on the magnitude of the alternating voltage applied to the voltage winding means within the rated range of said voltage.

2. An induction device as claimed in claim 1 wherein said soft magnetic path comprises a soft magnetic tongue spaced from the pole face of said voltage pole to establish an air gap therebetween within which a portion of said armature device is located, and a soft megnetic element connected in series with said last-named air gap, said soft magnetic tongue and said voltage pole to transmit said first magnetic flux, said soft magnetic element having a cross-section which saturates within the rated energization of said voltage winding means.

3. An induction device as claimed in claim 2 wherein said soft magnetic element establishes a path between a point adjacent the free end of the voltage pole and the free ends of said outer legs.

4. An induction device as claimed in claim 3 in combination with phasing means comprising a soft magnetic unit for directing magnetic flux between the magnetic element and the free end of the voltage pole through a path substantially clear of said armature device and an electroconductive unit linked with said last-named magnetic flux, at least one of said units being adjustable for varying the loading of the voltage winding means by the electroconductive unit.

5. An induction device as claimed in claim 2 wherein said soft magnetic element includes a soft magnetic bridge extending between the free ends of said legs across, and spaced from, the free end of the voltage pole, said tongue being located substantially between, and spaced from, the current poles adjacnt the air gap, a tie member connecting said tongue to said bridge at a point adjacent to said voltage pole, said tie member having a pole therethrough to provide said saturable cross-section, said tie member, tongue and bridge being integrally formed of soft magnetic sheet material, a soft magnetic unit located substantially between the mid point of the bridge and the free end of the voltage pole to conduct magnetic flux therebetween, and an electroconductive unit linked with magnetic flux passing through the magnetic unit to load said voltage winding for the purpose of establishing a predetermined phase relationship between the voltage applied to the voltage winding and said first magnetic flux, at least one of said units being adjustable to vary the loading of the voltage winding by said electroconductive unit and said phase relationship, and permanent magnet means directing magnetic flux through said armature device to brake rotation of said armature device.

6. An induction device as claimed in claim 5 wherein said soft magnetic unit includes a portion having a substantial negative temperature coefficient of permeability for providing Class II temperature compensation for said induction device.

7. An induction device responsive to a function of the volt-amperes in an alternating current circuit and including an electromagnet unit comprising an E-shaped planar soft magnetic section having a central voltage pole and two outer legs projecting from a yoke, said voltage pole having a free pole face, a soft magnetic current section having two current poles with free pole faces spaced from the voltage pole face to define an air gap therebetween, voltage winding means effective when energized in accordance with an alternating voltage within a rated range for directing alternating first magnetic flux through the voltage pole into the air gap, current winding means effective when energized by alternating current for directing alternating second magnetic flux through the current poles into the air gap to establish with the first magnetic flux a shifting resultant magnetic field in the air gap, and an electroconductive armature device mounted for rotation relative to the electromagnet unit about an axis, said armature device having a portion positioned in said air gap to develop a torque from said resultant magnetic field which acts to rotate the armature device relative to the electromagnet unit about the axis, the improvement which comprises a soft magnetic bridge having its ends connected respectively to the free ends of said legs and having a central part positioned adjacent, and spaced from, the free end of the voltage pole, a soft magnetic tongue connected to the central part of the bridge and located substantially in the same plane as the pole faces of said current poles, a soft magnetic unit for directing magnetic flux between said central part of the bridge and the free end of the voltage pole, and an electroconductive unit linked with the last named magnetic flux for loading said voltage winding means.

8. An induction device as claimed in claim 7 wherein said bridge and tongue are integrally constructed from a sheet of magnetic material.

9. An induction device as claimed in claim 8 wherein said tongue is connected to the bridge by a soft magnetic element having a cross-section proportioned to be saturated when the voltage winding means is energized within its rated range.

References Cited
UNITED STATES PATENTS

| | | | |
|---|---|---|---|
| 2,314,447 | 3/1943 | Green | 324—117 |
| 2,813,252 | 11/1957 | Leippe | 324—117 X |
| 3,212,005 | 10/1965 | Ramsey | 324—138 |

ALFRED E. SMITH, Primary Examiner